G. W. JACKSON.
BOOM AND BUCKET CONTROL FOR LOADING AND EXCAVATING MACHINES.
APPLICATION FILED APR. 22, 1918.
1,313,221.
Patented Aug. 12, 1919.
6 SHEETS—SHEET 2.
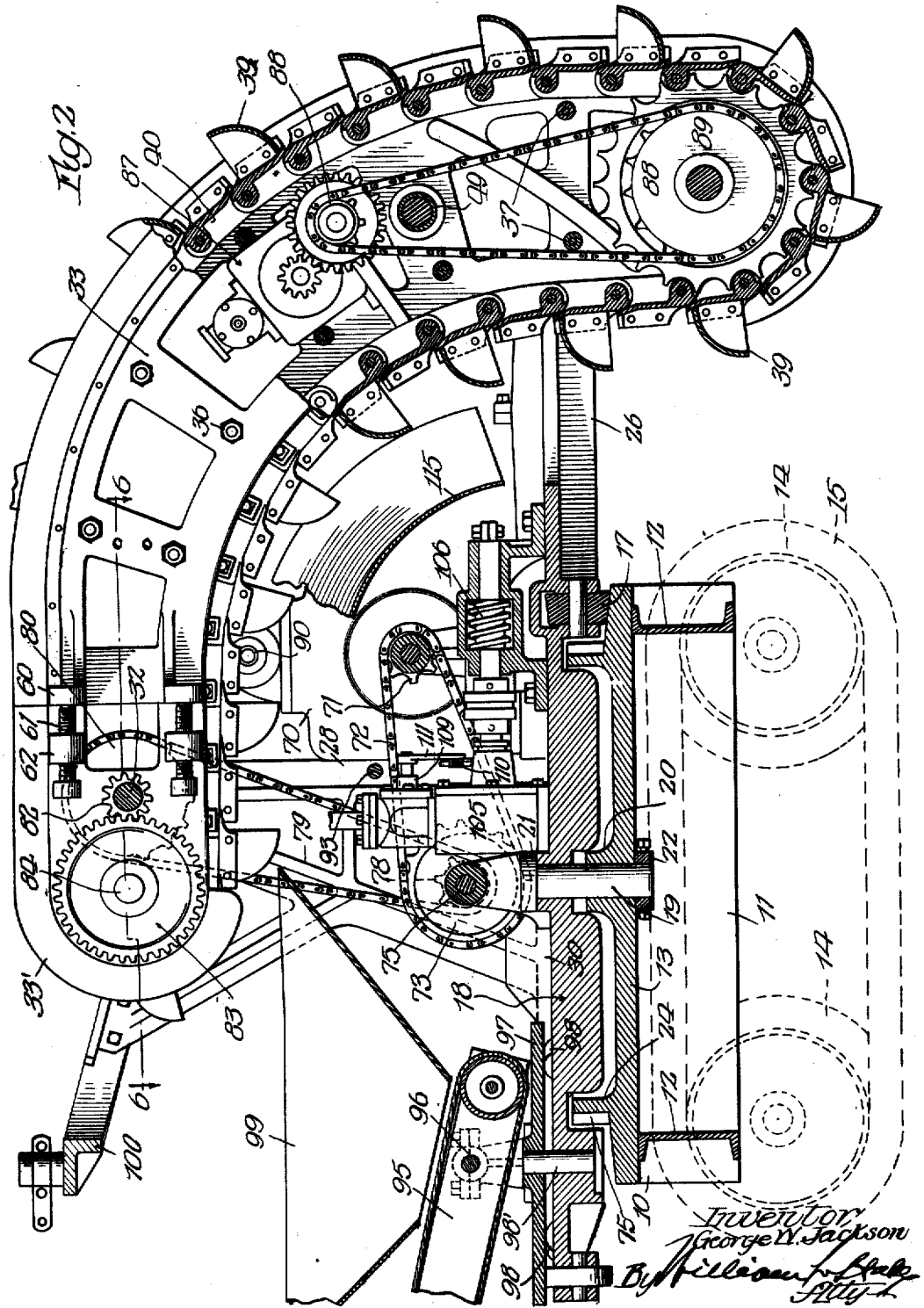

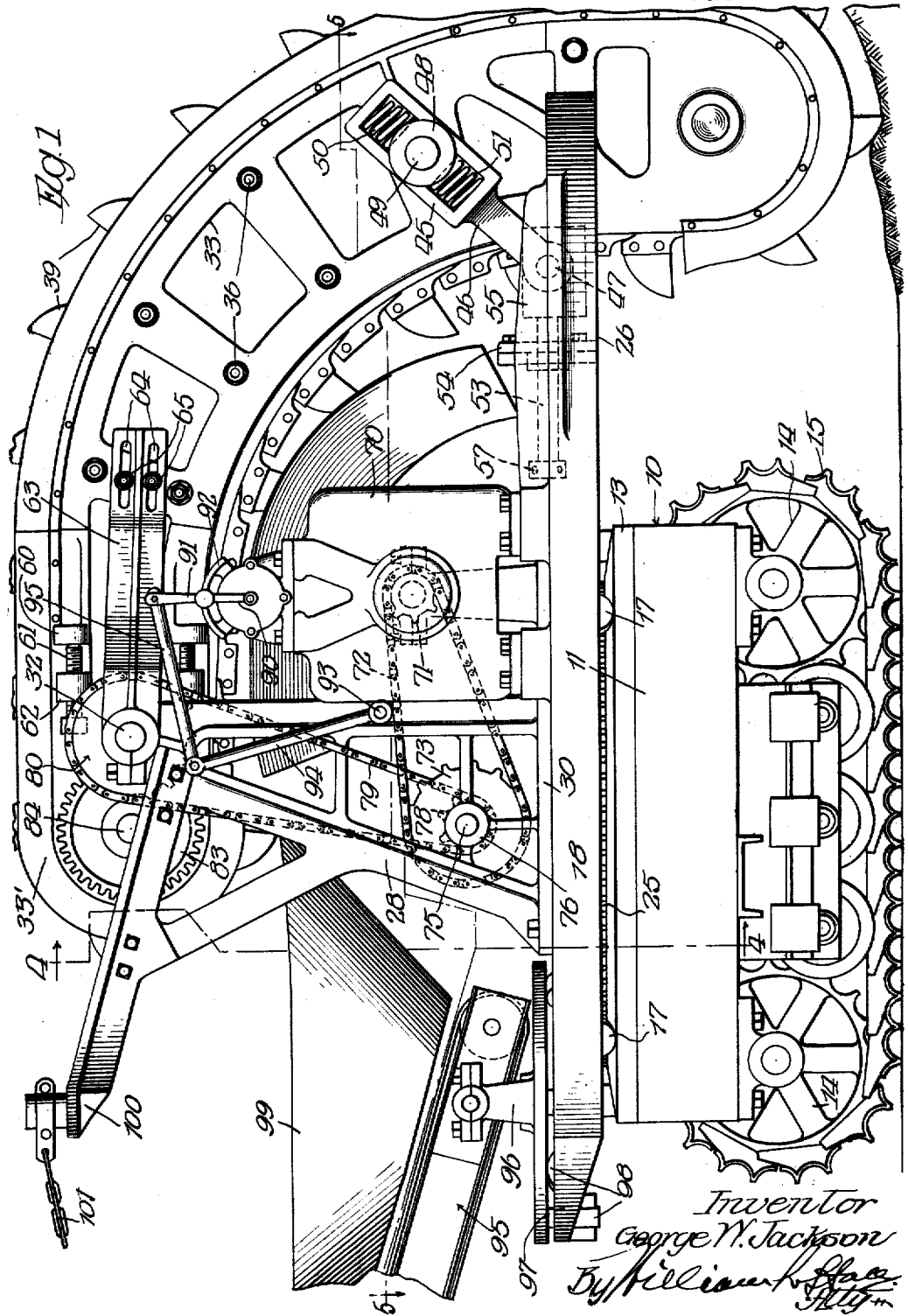

G. W. JACKSON.
BOOM AND BUCKET CONTROL FOR LOADING AND EXCAVATING MACHINES.
APPLICATION FILED APR. 22, 1918.
1,313,221.
Patented Aug. 12, 1919.
6 SHEETS—SHEET 3.
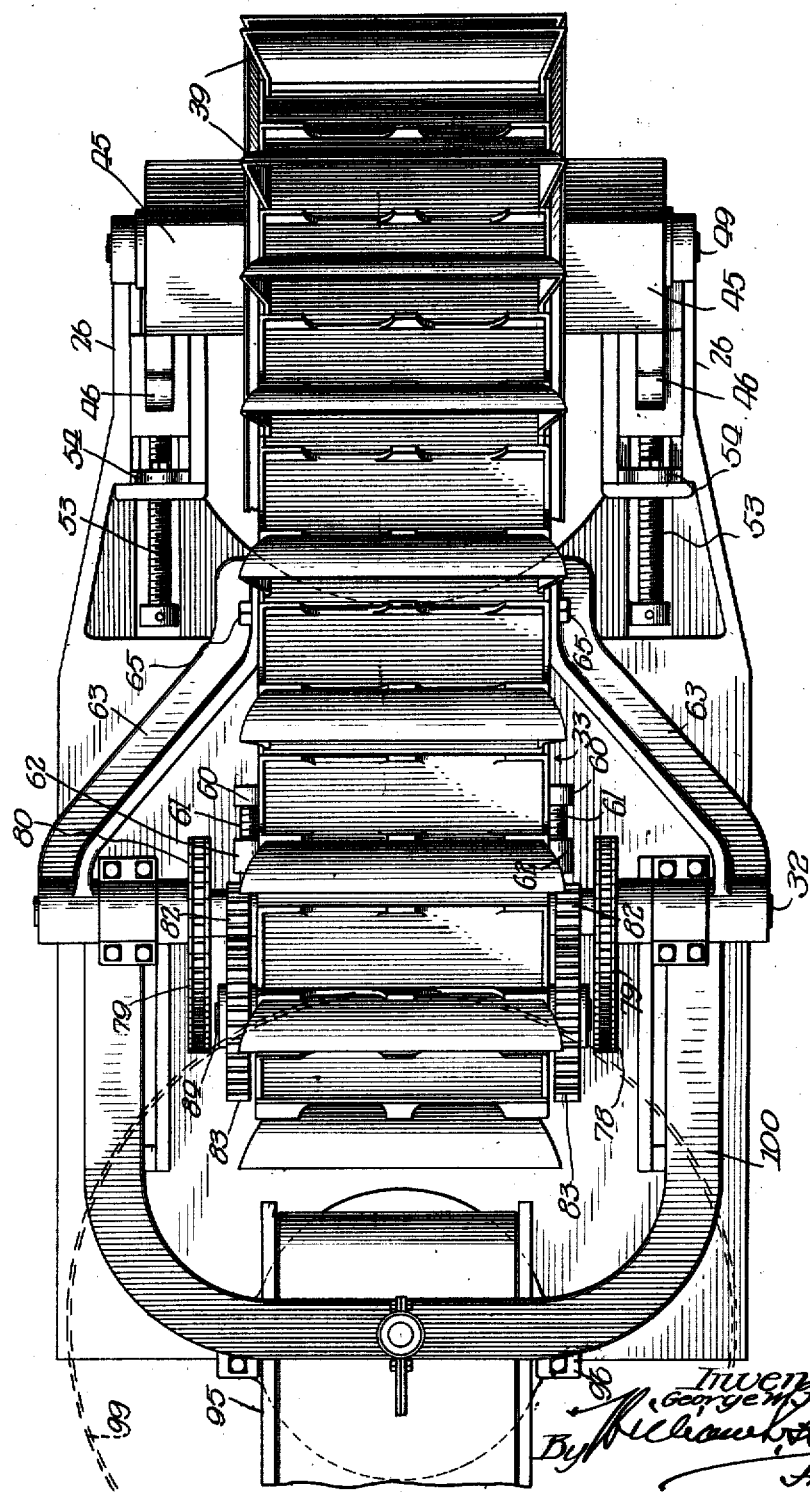

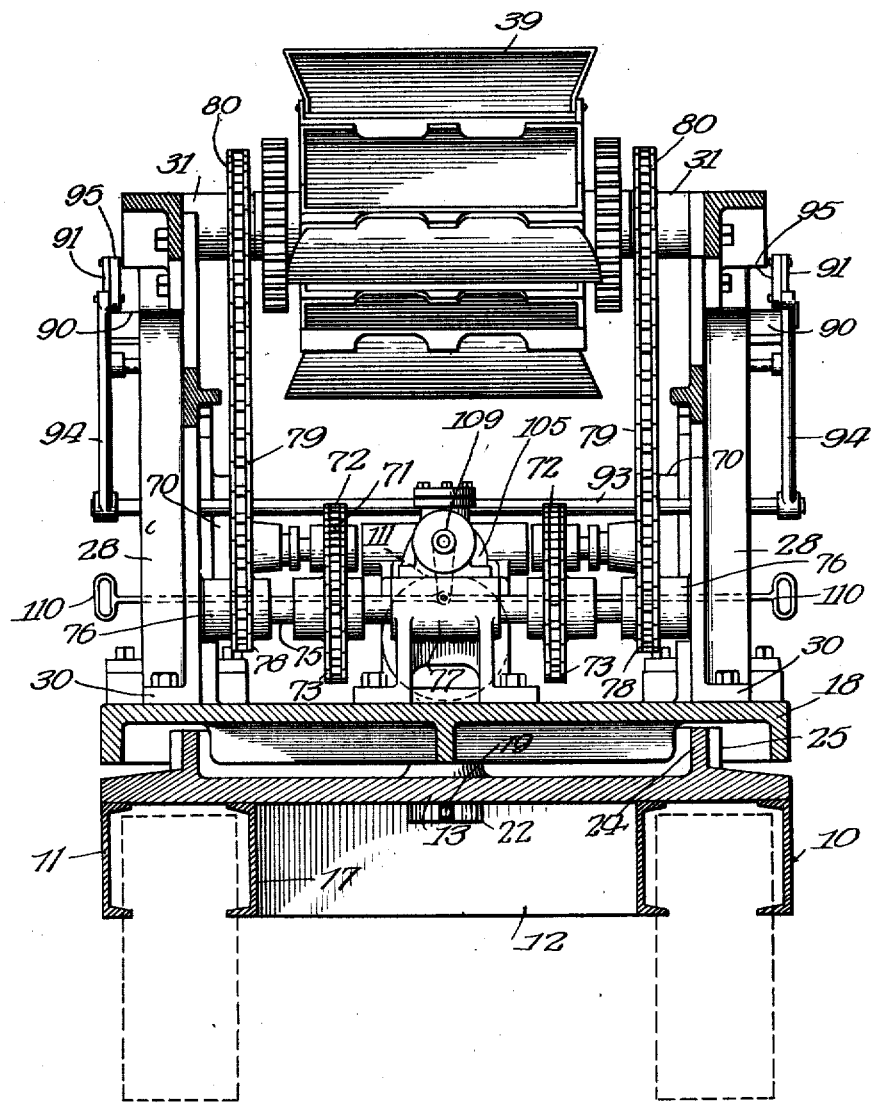

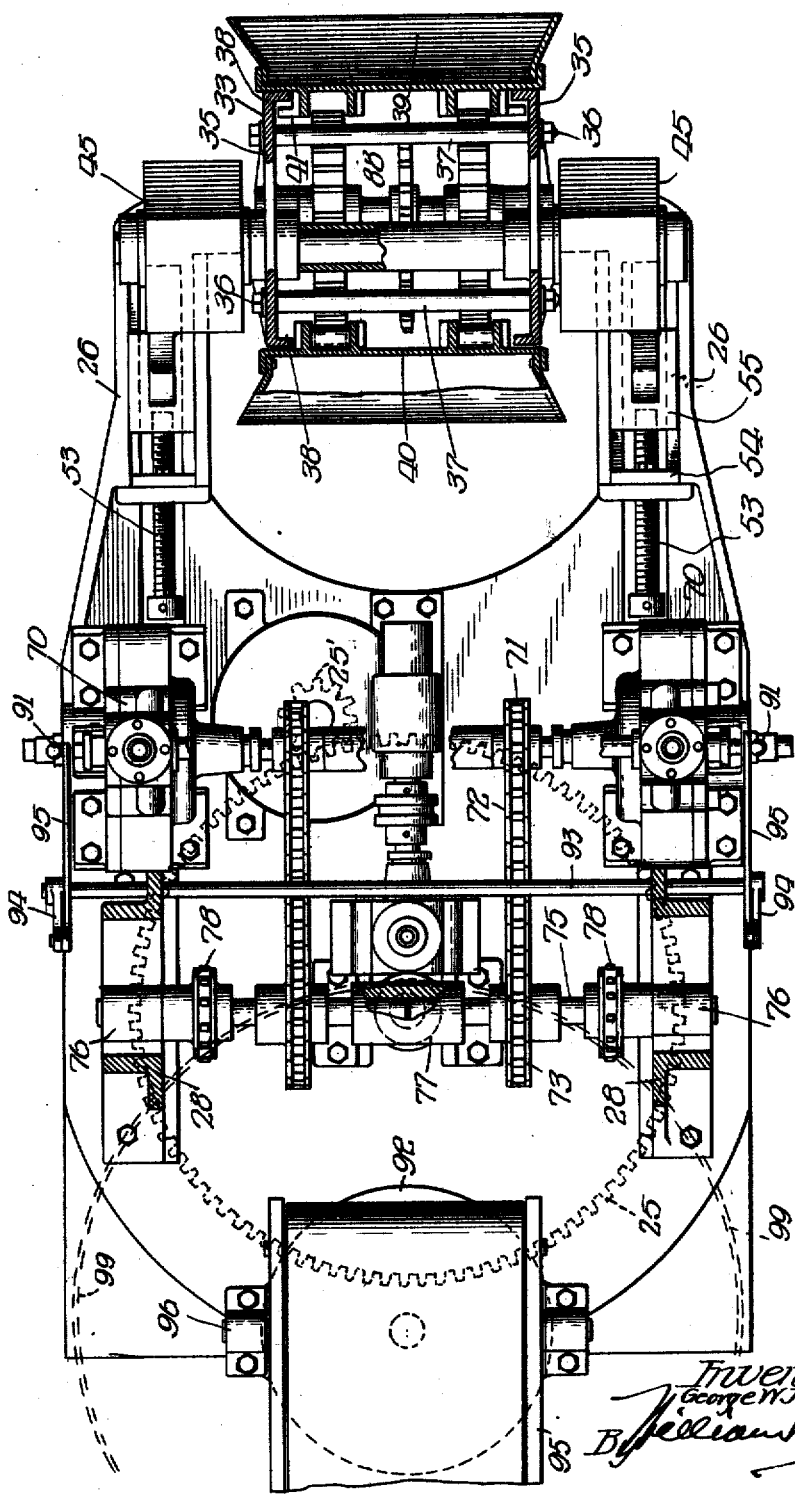

G. W. JACKSON.
BOOM AND BUCKET CONTROL FOR LOADING AND EXCAVATING MACHINES.
APPLICATION FILED APR. 22, 1918.
1,313,221.
Patented Aug. 12, 1919.
6 SHEETS—SHEET 6.
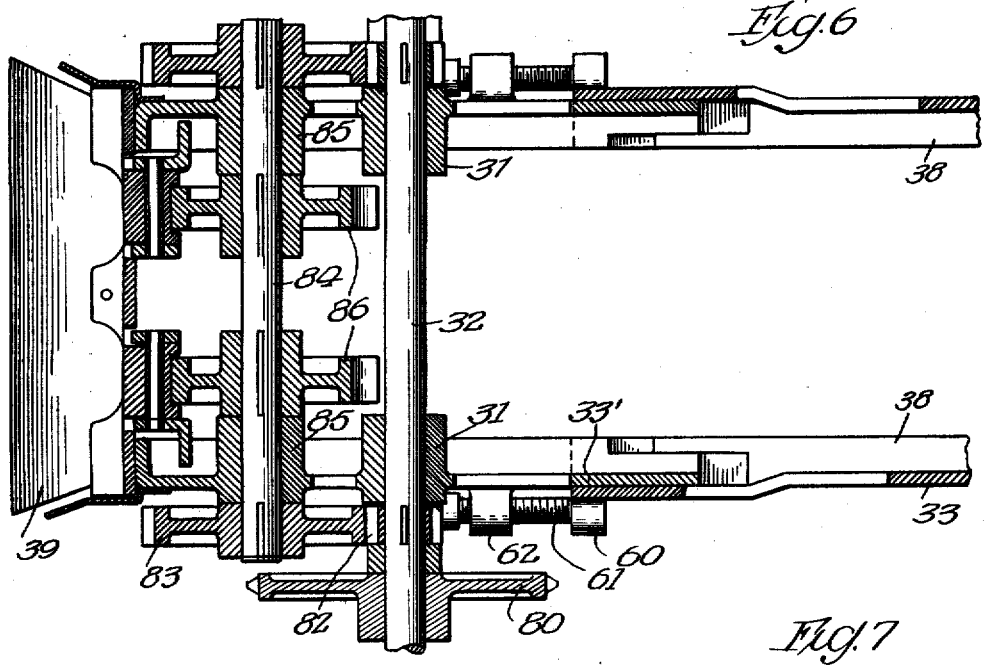
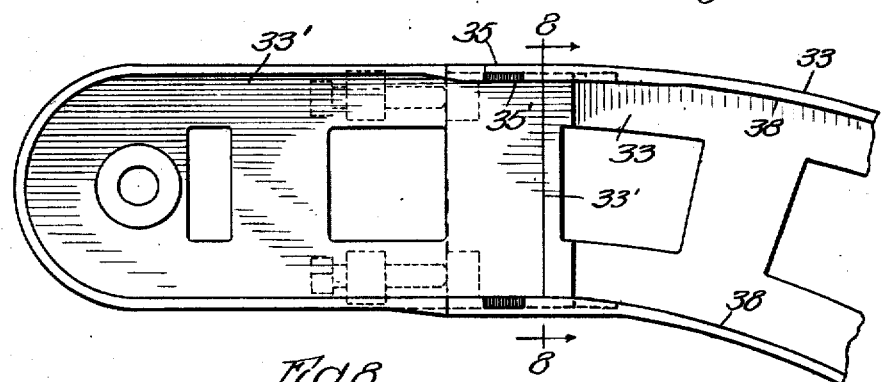
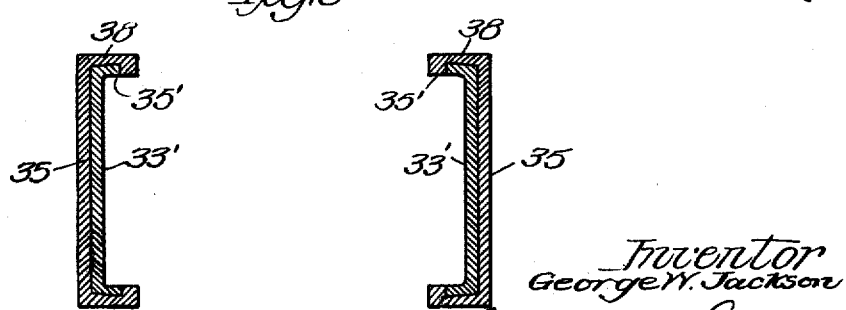
Inventor
George W. Jackson

UNITED STATES PATENT OFFICE.

GEORGE W. JACKSON, OF CHICAGO, ILLINOIS, ASSIGNOR, BY MESNE ASSIGNMENTS, TO AMERICAN POWER SHOVEL COMPANY, OF MILWAUKEE, WISCONSIN, A CORPORATION OF WISCONSIN.

BOOM AND BUCKET CONTROL FOR LOADING AND EXCAVATING MACHINES.

1,313,221.      Specification of Letters Patent.      Patented Aug. 12, 1919.

Application filed April 22, 1918. Serial No. 230,029.

*To all whom it may concern:*

Be it known that I, GEORGE W. JACKSON, a citizen of the United States, and a resident of Chicago, in the county of Cook and State of Illinois, have invented certain new and useful Improvements in Boom and Bucket Controls for Loading and Excavating Machines; and I do hereby declare that the following is a full, clear, and exact description thereof, reference being had to the accompanying drawings, and to the characters of reference marked thereon, which form a part of this specification.

This invention relates to improvements in machines for handling material, sometimes known as loading machines, constructed and arranged to pick up material from one point and carry it by a series of buckets and a take-off device to a point where the material is to be deposited or loaded on a transporting vehicle.

The invention relates more particularly to the construction and arrangement of the boom for supporting the buckets or scoops by which the material picked up and carried backwardly, and to the means for adjusting the bucket carrying boom and for actuating the endless series of buckets thereon.

Among the objects of the invention is to provide a construction in a machine of this character which adapts the machine to handle heavy materials, such as broken stone, coal, ore, and the like, and which is also adapted, in the manner of a trench machine, to remove normally solid materials, such, for instance, as earth, unbroken ore deposits, and the like, and carry them backwardly to a place of disposal.

Other objects of the invention are to improve, simplify, and increase the efficiency of machines of this character, and the invention consists in the combination and arrangement of the parts as shown in the drawings and described in the specification, and is pointed out in the appended claims.

In the drawings,

Figure 1 is a partial side view of a machine embodying my invention.

Fig. 2 is a vertical section thereof with parts in elevation.

Fig. 3 is a plan view of the machine.

Fig. 4 is a vertical section on the line 4—4 of Fig. 1.

Fig. 5 is a horizontal section on the line 5—5 of Fig. 1.

Fig. 6 is a section on the line 6—6 of Fig. 2.

Fig. 7 is a partial side elevation of the boom.

Fig. 8 is a section on the line 8—8 of Fig. 7.

As shown in the drawings, the machine is supported on a carriage 10 comprising longitudinal channel beams, 11, transverse channel beams 12, and a cast metal bed plate 13, all suitably secured together to produce a solid unitary structure. Said carriage is supported on and directed by a caterpillar drive, embracing toothed wheels 14, 14 and an endless series of articulated tread sections 15 (Fig. 1) trained thereabout. The construction of the caterpillar drive, as herein shown, is like that illustrated in my prior application for United States Letters Patent Serial Number 223,058, filed March 18, 1918, but may be otherwise constructed and arranged.

Supported on the carriage, through the medium of anti-friction rollers 17, is a cast metal turntable 18. It rotates about an axis consisting as herein shown, of a vertical shaft 19 that is seated in and extends upwardly through a boss 20 of the bed plate. The shaft 19 is held in place by upper and lower washers 21, 22, respectively. The bed plate 13 is provided with an upstanding flange 24, which extends into an annular, downwardly opening, recess in the turntable, and is provided with a curved series of teeth 25 which are adapted to be engaged by a pinion 25' rotatively mounted on the turntable and driven from any suitable source of power, whereby the turntable may be rotated about its pivot shaft 19, so as to direct the buckets on the boom, hereinafter described, to the work through an arc of approximately 180 degrees.

The turntable is provided at the forward end of the machine with forwardly directed, laterally spaced, arms 26, which, as herein shown, are made integral with the turntable. Rising from the turntable at laterally opposite sides thereof, and abreast the pivot shaft 19, are cast metal standards 28 which comprise flanged members that are rigidly connected at their upper ends, and the bases 30 of which are bolted or otherwise rigidly secured to the turntable. The upper ends of the standards are fashioned to form bearings 31 for a shaft 32 on which is pivotally mounted the rear end of a boom, designated as a whole by 33. Said boom comprises a rear, generally horizontal, portion and a forwardly tending, downwardly curved portion. It comprises side, inwardly flanged plates 35 that are connected by tie bolts 36 and spaced by spacing tubes 37 to form a rigid boom structure. The flanges 38 of said side members constitute tracks to support an endless series of buckets 39, in the manner illustrated in my prior application for United States Letters Patent Serial Number 224,439, filed March 25, 1918; the tracks at the upper side of the boom directly supporting the bucket sections 40, and the tracks at the lower side of the boom supporting said bucket sections through the medium of laterally extending arms 41 integral with said bucket sections, as best shown in Fig. 5. Said track flanges are curved at the ends of the boom to constitute continuous tracks for the endless bucket structure. The construction of the bucket structure constitutes no part of the present invention and the details thereof need not be specially referred to herein.

The boom is supported on the arms 26 through the medium of buffer yokes 45, the necks 46 of which are pivoted at their lower ends at 47 to parts carried by and fixed on the arms 26. Said yokes are slotted to receive bearings 48 for a shaft 49 that extends laterally through the boom. Upper and lower spiral springs 50, 51 are interposed between said bearings 48 and the end walls of the yokes, the function of which springs is to cushion the connection between the buffer yokes and the forwardly extending arms 26 of the turntable, and thereby relieve the shaft 49 and its bearings, as well also as the pivot 46 for the yokes, from strains and stresses due to sudden impact of loads against the buckets.

Preferably, and as herein shown, the buffer yokes are associated with means by which the forward end of the boom may be raised and lowered. Said means consists, in the present instance, of threaded, horizontal shafts 53 that extend through and are threaded in fixed abutments or nuts 54 which are suitably attached to and rigid with the arms 26 of the turntable. The forward ends of said shafts bear against blocks 55 that are fitted to slide in suitable guides on the arms 26 and which carry the pivots 47 for the necks 46 of the buffer yokes. Said shafts 53 are provided at their rear ends with apertured enlargements that are adapted to receive an implement by which the shafts may be rotated.

With this construction it will be apparent that when the blocks 55, through the action of said shafts 53, are shifted forwardly to thereby shift the pivoted ends of the buffer yokes forwardly, the forward end of the boom will be raised, swinging about its pivot shaft 32, and that when said blocks 55 are shifted rearwardly the forward end of the boom will be lowered.

The boom is made of such construction that it may be endwise extended in order to afford means to take up the slack of the articulated bucket structure supported thereon. For this purpose the rear end 33′ of the boom is made separate from and is supported on the main boom structure, with the flanges 35′ of the rear, detachable end of the boom fitted and sliding within the flanges 38 of the main boom structure to constitute a telescopic connection. The said flanges 38 and 35′ are formed with interlocking notches and tongues, as shown in Figs. 6, 7, and 8, to additionally stiffen the telescopic joints of the boom. The main boom structure is provided at its rear end with lugs 60 against which bear threaded shafts 61 which extend through and are threaded in lugs 62 of the rear adjustable boom section. The lugs 60 and 62 and the screw shaft 61 constitute means to adjustably elongate the boom for the purpose of taking up the slack of the bucket structure supported thereon. In addition to the adjusting means described there are provided braces 63 which are supported on the boom pivot shaft 32 and extend forwardly therefrom and obliquely inwardly toward the boom sides, and are formed at their forward ends with slots 64 through which extend clamping screws 65 by which the said braces are fixedly and adjustably connected to the boom.

The endless bucket structure is driven by motor driven mechanism made as follows:

70, 70 designate motors, located one at each side of the turntable and bolted or otherwise detachably secured thereto. The said motors may be of any desired type, as compressed air motors, electric motors, steam engines, or the like. The shafts of said motors carry sprocket pinions 71 which are connected by sprocket belts 72 with sprocket gears 73 that are fixed to a horizontal shaft 75 which extends transversely across the turntable in the plane of its pivot, as herein shown. Said shaft 75 is a divided shaft, and the sections thereof are mounted in bearings 76 carried by the standards 28 and an intermediate bearing 77 which rises from the turntable and which supports the inner ends of the shaft sections. The shaft 75 is provided adjacent to each standard 28 with sprocket gears 78 that are connected by belts 79 with sprocket gears 80 that are mounted on and fixed to the boom pivot shaft 32. Said boom pivot shaft is provided laterally inside the sprocket gears with pinions 82 that mesh with gear wheels 83 which are fixed to the ends of a shaft 84 that is disposed transversely of the rear end of the boom and mounted in suitable bearings 85 carried by said rear end of the boom. Said shaft 84 is provided with sprocket wheels 86 which mesh with suitably formed parts of the bucket structure, in the nature of a sprocket belt connection, whereby rotation of the gears 86 imparts traveling movement to the bucket structure on the flanged tracks of the boom.

Preferably also the bucket structure is driven by a third motor 87 which is located within the hollow boom structure and is connected by a train of sprocket gears 88 to the shaft of the pulleys 89 of the front end of the boom about which the flexible bucket structure is trained. Said motor 87 may be used in conjunction with the motors 70 or may, for lighter work, be used alone to drive the buckets. The application of power to the bucket structure at both ends of the boom enables great force to be applied to the structure to drive the buckets into the work.

The valve mechanisms 90 for said motors 70 are controlled by levers 91 connected concentrically to said valve mechanisms and operating on segments 92. Preferably, both said valve mechanisms are connected so as to be operated from the same side of the machine. The connection herein shown consists of a rock shaft 93 which extends across the machine, and has bearing in the standards 28, crank arms 94 fixed to said rock shaft, and links 95 which connect said crank arms to the levers 91. The valve control described enables the motors 70 to be operated in either direction, so that the travel of the bucket structure may be reversed, and again driven forwardly when it is desired to exert repeated attacks against the work to drive the buckets into the material being handled.

The material is discharged from the series of buckets at the rear end of the boom onto a take-off belt supported on a frame 95. Said frame is pivotally mounted on standards 96 which rise from and are connected to a small turntable 97 that is supported through the medium of anti-friction rollers 98 on the rear end of the main turntable 18, said turntable rotating on a fixed shaft 98' which is seated in the main turntable. A hopper 99 receives the material and directs it to said take-off belt. The frame is supported from the standards 28 through the medium of a yoke 100, which is rigid with the standards 28 and a chain or cable 101 in the manner shown in my pending application for United States Letters Patent Serial Number 195,-213, filed on the 8th day of October 1918.

The turntable operating pinion 25' is herein shown as driven by a motor 105 that is supported on the turntable between the standards 28 and is connected through the medium of a worm 106 and a worm wheel 107 with the shaft 108 of said pinion 25'. The valve mechanism 109 of said motor, which is a reversing valve mechanism, is operated through the medium of links 110 which are attached at their inner ends to a lever arm 111 of said valve mechanism and extend toward the opposite sides of the machine, whereby said motor 105, as well as the motor 70, may be operated from either side of the machine.

In the operation of the machine, the carriage may be driven forwardly during the operation of the buckets so as to force the buckets into the work, and the traveling bucket structure may be operated either by the motor 70 or the motor 80, or both, to force them into the work. The boom and the traveling bucket structure thereon are directed sidewise to the work either through rotation of the turntable or by maneuvering or steering the machine through the proper control of the mechanism by which the caterpillar drive is operated.

The end of the boom may be raised or lowered through the action of the screw shafts 53 and the buffer yokes 45 and swings about the shaft 32 as a pivot. The material is directed to the take-off belt at the rear, by which it is carried to the place of disposal.

Preferably a guard or housing 115 is arranged beneath the rear portion of the boom so as to avoid material falling on the transmission mechanism therebelow.

I claim as my invention:

1. A machine for the purpose set forth comprising a carriage, a turntable thereon, standards rising from the turntable, a boom pivotally supported near its rear end on said standards, buffer members pivotally supported on the turntable, with means for connecting them to the boom near its forward end, an endless series of take-up devices travelable on the boom, and means to movably support said buffer members on the turntable to thereby adjustably raise and lower the front end of the boom.

2. A machine for the purpose set forth comprising a carriage, a turntable thereon, standards rising from the turntable, a boom pivotally supported near its rear end on said standards, buffer members pivotally connected to said boom near its forward end, blocks seated and slidable on the turntable to which the lower ends of the buffer members are pivotally connected, and screw threaded means for adjusting and holding the blocks in their seats on the turntable.

3. A machine for the purpose set forth comprising a carriage, a turntable thereon, standards rising from the turntable, a boom pivotally supported near its rear end on said standards, laterally spaced yokes pivotally supported on the turntable, a shaft extending through and mounted in the boom, bearings in said yokes to receive the ends of the shafts, and springs between said bearings and the ends of the yokes.

4. In a machine for the purpose set forth, a support, a boom projecting forwardly beyond said support, standards rising from said support, a shaft mounted on said standards to which the boom is pivoted near its rear end, means to sustain the forward end of the boom from said support, an endless bucket structure carried by the boom and traveling thereon, said boom being constructed with two members slidably engaging each other, whereby the boom may be extended in length to take up the slack of the bucket structure, means to adjustably lock said members of the boom together, and braces formed at their rear ends with bearings to receive the ends of the boom pivot shaft and extending forwardly therefrom toward and attached to the sides of the boom.

5. In a machine for the purpose set forth, a support, a boom projecting forwardly beyond said support, standards rising from said support, a shaft mounted on said standards to which the boom is pivoted near its rear end, an endless bucket structure carried by said boom and traveling thereon, said boom being constructed of two members slidably engaging each other, whereby the boom may be extended in length to take up the slack of said bucket structure, means to adjustably lock said members of the boom together, braces formed at their rear ends with bearings to receive the ends of said pivot shaft and formed at their forward ends with slots, and fastening bolts extending through said slots into the boom.

6. In a device for the purpose set forth, a support, standards rising therefrom, a shaft mounted in said standards, a boom pivoted near its rear end to said shaft and extending forwardly beyond the support, an endless bucket structure supported on the boom, braces formed at their rear ends to provide bearings to receive the ends of said pivot shaft, and means to fasten said braces at their forward ends to the sides of the boom.

7. A machine for the purpose set forth comprising a support, standards rising therefrom, a shaft supported on said standards, a boom pivoted near its rear end to said shaft and extending forwardly beyond said support, an endless bucket structure traveling on the boom, motors mounted on said support at the sides of the boom, a divided transverse shaft mounted in bearings on said support and provided at its ends with sprocket pinions and operatively connected with the motors, sprocket wheels mounted on the ends of the pivot shaft and connected by belts with the sprocket pinions of the divided shaft, and gear connections between said pivot shaft and the driving means for said bucket structure.

8. A machine for the purpose set forth comprising a support, standards rising therefrom, a shaft supported on said standards, a boom pivoted near its rear end to said shaft and extending forwardly beyond and sustained on said support, an endless bucket structure mounted to travel on the boom, motors mounted on said support at the sides of the boom, a divided transverse shaft rotatively mounted in bearings on said support and provided at its ends with sprocket pinions and operatively connected with the motors, sprocket wheels fixed to the ends of said pivot shaft and connected by belts with the sprocket pinions of the divided shaft, and gear connections between said pivot shaft and the driving means for said bucket structure.

9. A machine for the purpose set forth comprising a support, standards rising therefrom, a shaft supported on said standards, a boom pivoted near its rear end to said shaft and extending forwardly beyond and sustained on said support, an endless bucket structure mounted to travel on the boom, motors mounted on said support at the sides of the boom, a divided transverse shaft rotatively mounted in bearings on said support and provided at its ends with sprocket pinions and operatively connected with the motors, sprocket wheels fixed to the ends of said pivot shaft and connected by belts with the sprocket pinions of the divided shaft, gear connections between said pivot shaft and the driving means for said bucket structure, and a valve controlling device for said motors constructed with means to be operated from either side of the boom.

10. A machine for the purpose set forth comprising a support, standards rising therefrom, a shaft sustained on said standards, a boom pivoted near its rear end to said shaft and extending forwardly beyond said support, an endless bucket structure mounted on the boom, motors mounted on said support at the sides of the boom, a divided transverse shaft operatively connected with the motors and mounted in bearings on said support and provided at its ends with pinions, sprocket wheels mounted on the ends of the pivot shaft and driven from the pinions of the divided shaft, and gear connections between said pivot shaft and the driving means for the bucket structure.

11. A machine for the purpose set forth comprising a support, standards rising therefrom, a shaft sustained on said standards, a boom pivoted near its rear end to said shaft and extending forwardly beyond said support, an endless bucket structure mounted to travel on the boom, motors mounted on said support at the sides of the boom, a divided transverse shaft operatively connected with the motors and mounted in bearings on said support and provided at its ends with pinions, sprocket wheels mounted on the ends of the pivot shaft and driven from the pinions of the divided shaft, gear connections between said pivot shaft and the driving means for the bucket structure, and a valve controlling device for said motors comprising a rock shaft extending across the machine and provided with crank arms and means for connecting the crank arms to the actuating members of the motor valves.

12. In a machine for the purpose set forth, the combination with a boom, and a series of traveling take-off devices thereon, combined with supporting pulleys at the ends of the boom to direct and support the take-off devices, motors at the side of the boom, a transversely disposed divided shaft operatively connected with the motors, pinions at the ends of said shaft, means separately connecting said motors to the sections of the divided shaft, and means to operatively connect the pinions of said divided shaft to the directing and supporting pulleys of the take-off device at one end of the boom.

13. In a machine for the purpose set forth, a boom, an endless bucket structure supported and traveling thereon, with pulleys at the ends of the boom for drawing and directing the bucket structure, of bucket structure driving motors, and means to separately connect both said motors to the said pulleys.

In testimony whereof I claim the foregoing as my invention I hereunto append my signature at Chicago, Illinois, this eighteenth day of April, 1918.

GEORGE W. JACKSON.

Copies of this patent may be obtained for five cents each, by addressing the "Commissioner of Patents, Washington, D. C."